(12) United States Patent
Chen

(10) Patent No.: US 7,325,314 B1
(45) Date of Patent: Feb. 5, 2008

(54) HANDSAW HAVING REPLACEABLE BLADE

(75) Inventor: Yu-Heng Chen, Changhua Hsien (TW)

(73) Assignee: King Jaws Metal Co., Ltd., Changhua Hsien (TW)

( * ) Notice: Subject to any disclaimer, the term of this patent is extended or adjusted under 35 U.S.C. 154(b) by 232 days.

(21) Appl. No.: 11/080,246

(22) Filed: Mar. 15, 2005

(51) Int. Cl.
*B25B 5/00* (2006.01)
*B27B 21/00* (2006.01)

(52) U.S. Cl. .................. 30/337; 30/166.3; 30/331; 30/342; 30/517

(58) Field of Classification Search ............ 30/280, 30/506, 511, 513, 514, 517, 162, 329–342, 30/51, 260, 166.3, 236; D8/97–98
See application file for complete search history.

(56) References Cited

U.S. PATENT DOCUMENTS

| | | | | |
|---|---|---|---|---|
| 156,369 A * | 10/1874 | Millspaugh | .................. | 30/517 |
| 601,480 A * | 3/1898 | Powell | .................. | 30/517 |
| 1,018,210 A * | 2/1912 | Segel et al. | .................. | 279/77 |
| 1,541,611 A * | 6/1925 | Arnold | .................. | 30/166.3 |
| 2,137,800 A * | 11/1938 | Davey | .................. | 30/517 |
| 2,432,626 A * | 12/1947 | Lenk | .................. | 30/506 |
| 3,825,047 A * | 7/1974 | McManus et al. | .................. | 30/166.3 |
| 3,900,950 A * | 8/1975 | Collins | .................. | 30/337 |
| 5,722,168 A * | 3/1998 | Huang | .................. | 30/161 |
| 5,930,902 A * | 8/1999 | Hsu | .................. | 30/331 |
| 5,979,065 A * | 11/1999 | Hsu | .................. | 30/519 |
| 6,112,420 A * | 9/2000 | Schickerling | .................. | 30/392 |
| 6,516,525 B2 * | 2/2003 | Liu | .................. | 30/519 |
| 6,694,620 B2 * | 2/2004 | Kanzawa | .................. | 30/161 |
| 6,854,187 B2 * | 2/2005 | Huan | .................. | 30/392 |
| 7,065,885 B1 * | 6/2006 | Chen | .................. | 30/517 |
| 2003/0037444 A1 * | 2/2003 | Chunn | .................. | 30/337 |
| 2003/0070299 A1 * | 4/2003 | Frazer | .................. | 30/161 |

* cited by examiner

*Primary Examiner*—Boyer D. Ashley
*Assistant Examiner*—Laura M. Lee
(74) *Attorney, Agent, or Firm*—Alan Kamrath; Kamrath & Associates PA

(57) ABSTRACT

A handsaw includes a handle, a blade removably mounted on the handle, and a press button pivotally mounted on the handle and detachably engaged with the blade to lock the blade on the handle and unlock the blade from the handle. Thus, the blade can be detached from the handle easily and rapidly by pressing the pressing portion of the press button, thereby facilitating the user replacing the blade. In addition, the concave face of the blade is rested on the convex face of the handle, so that the blade is supported by the handle rigidly and stably, thereby facilitating a user operating the handsaw.

14 Claims, 5 Drawing Sheets

HANDSAW HAVING REPLACEABLE BLADE

BACKGROUND OF THE INVENTION

1. Field of the Invention

The present invention relates to a handsaw, and more particularly to a handsaw having a replaceable blade.

2. Description of the Related Art

A conventional handsaw comprises a handle, and a blade mounted on the handle. However, the blade is fixed on the handle so that the blade cannot be replaced easily when it is worn out, thereby causing inconvenience to a user in replacing the blade.

The closest prior art reference of a conventional handsaw having a replaceable blade was disclosed in the Taiwanese Patent Application No. 093204283. However, in the above-mentioned conventional handsaw, it is necessary to detach all of the parts of the handle when replacing the blade and to assemble all of the parts of the handle after replacement of the blade, thereby causing inconvenience to a user in replacing the blade.

SUMMARY OF THE INVENTION

In accordance with the present invention, there is provided a handsaw, comprising a handle; a blade removably mounted on the handle; and a press button pivotally mounted on the handle and detachably engaged with the blade to lock the blade on the handle and unlock the blade from the handle.

The primary objective of the present invention is to provide a handsaw having a replaceable blade.

Another objective of the present invention is to provide a handsaw, wherein the blade is replaced easily and conveniently.

A further objective of the present invention is to provide a handsaw, wherein the blade can be detached from the handle easily and rapidly by pressing the pressing portion of the press button, thereby facilitating the user replacing the blade.

A further objective of the present invention is to provide a handsaw, wherein the concave face of the blade is rested on the convex face of the handle, so that the blade is supported by the handle rigidly and stably, thereby facilitating a user operating the handsaw.

Further benefits and advantages of the present invention will become apparent after a careful reading of the detailed description with appropriate reference to the accompanying drawings.

DETAILED DESCRIPTION OF THE INVENTION

Figure 1:
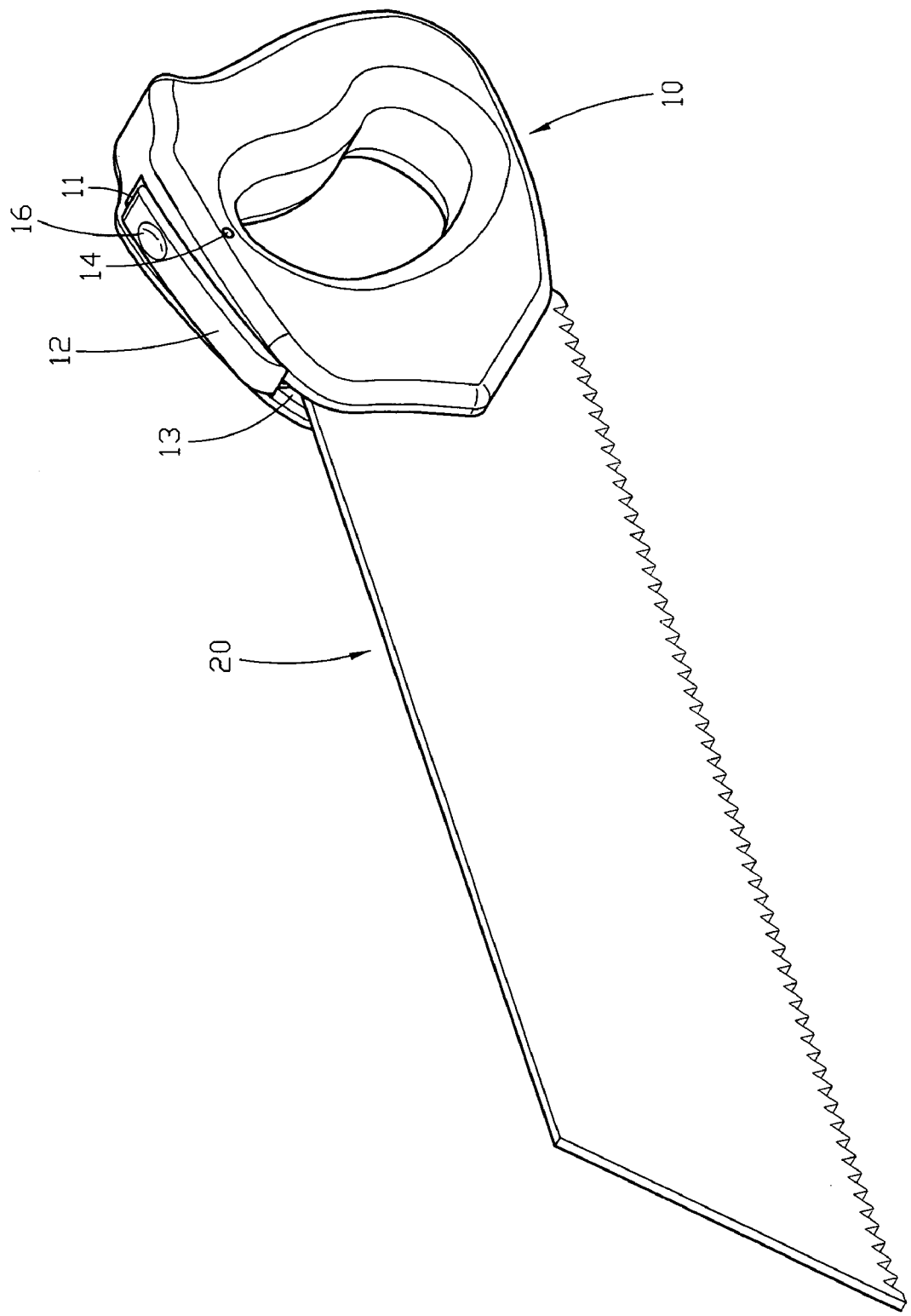
FIG. 1 is a perspective view of a handsaw in accordance with the preferred embodiment of the present invention.
Figure 2:
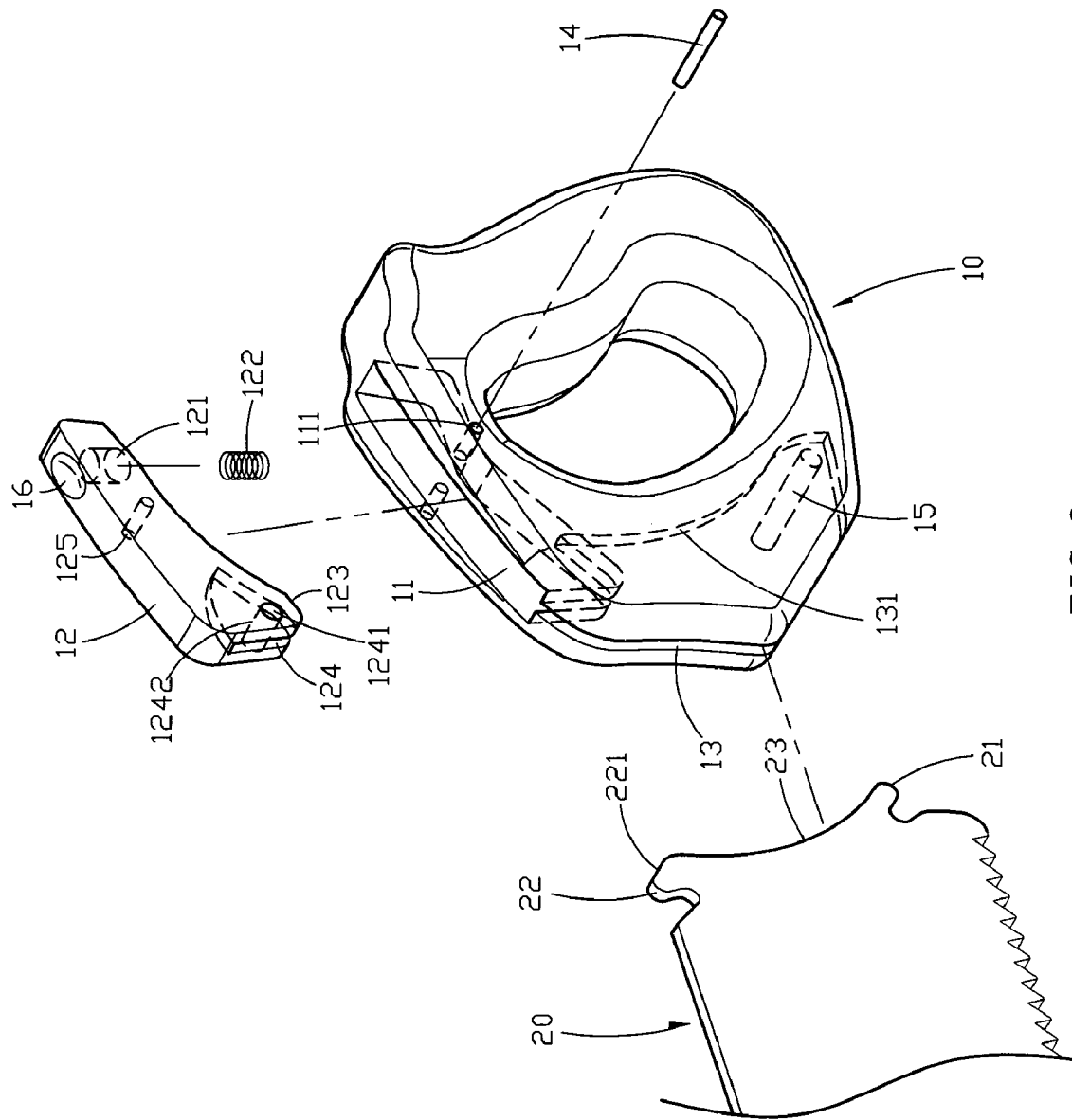
FIG. 2 is an exploded perspective view of the handsaw as shown in FIG. 1.
Figure 3:
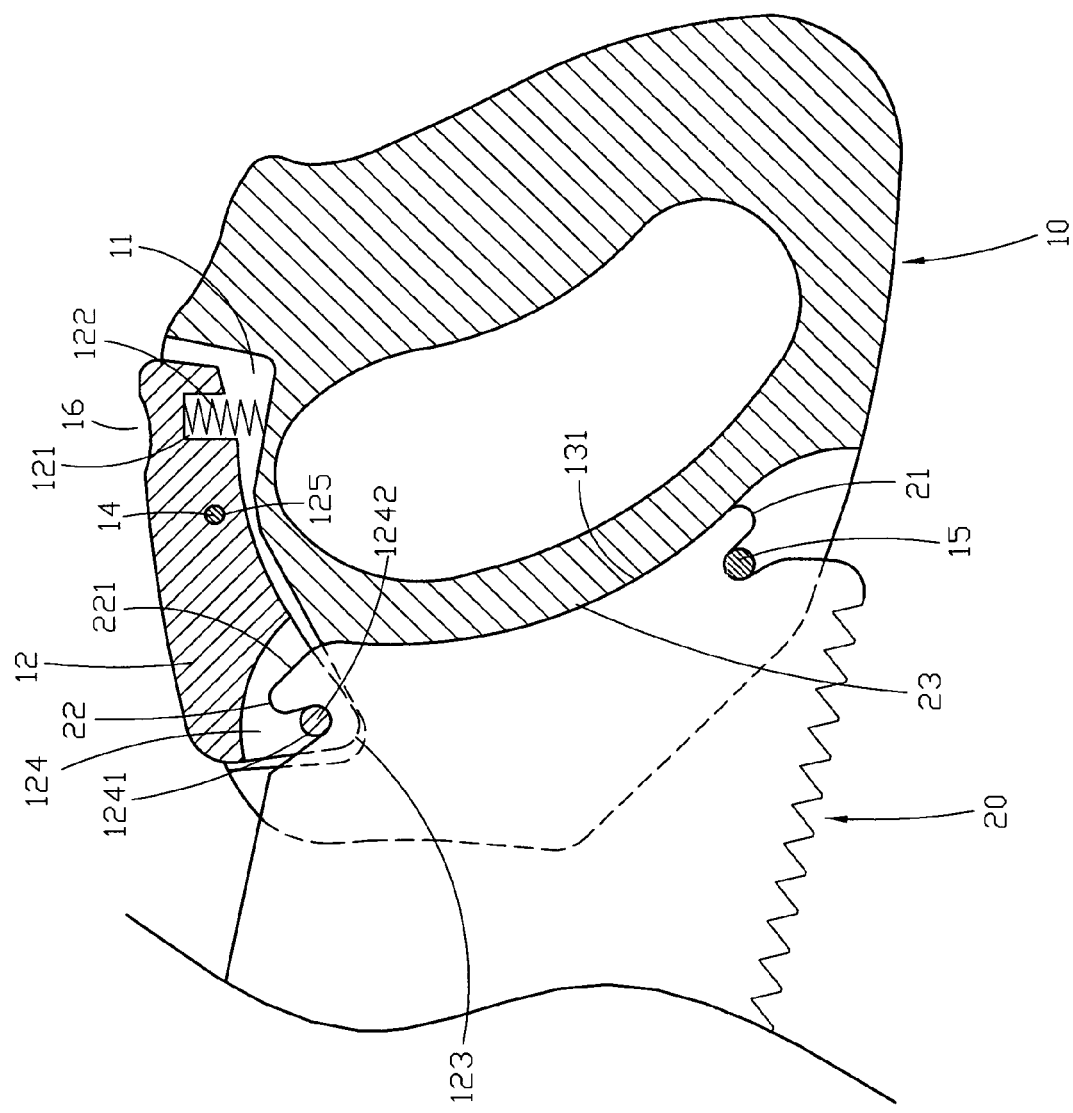
FIG. 3 is a plan cross-sectional view of the handsaw as shown in FIG. 1.

Referring to the drawings and initially to FIGS. 1-3, a handsaw in accordance with the preferred embodiment of the present invention comprises a handle 10, a blade 20 removably mounted on the handle 10, and a press button 12 pivotally mounted on the handle 10 and detachably engaged with the blade 20 to lock the blade 20 on the handle 10 and unlock the blade 20 from the handle 10.

The handle 10 has a top face formed with a longitudinal receiving chamber 11 to receive the press button 12 and has a peripheral wall formed with a transverse fixing hole 111 extended through and communicated with the receiving chamber 11. The handle 10 has a side face formed with a mounting recess 13 having a first end communicated with the receiving chamber 11 and a second end provided with a positioning pin 15. The mounting recess 13 of the handle 10 has a bottom wall formed with an arc-shaped convex face 131.

The press button 12 is pivotally mounted in the receiving chamber 11 of the handle 10 and has a mediate portion formed with a pivot hole 125 aligning with the fixing hole 111 of the handle 10. A pivot pin 14 is extended through the fixing hole 111 of the handle 10 and the pivot hole 125 of the press button 12 so that the press button 12 is pivotally mounted on the handle 10. The press button 12 has a first end formed with a longitudinal locking groove 124 and a transverse positioning hole 1241 extended through and communicated with the locking groove 124. A locking pin 1242 is extended through the positioning hole 1241 of the press button 12 and straddles the locking groove 124 of the press button 12. The first end of the press button 12 has a peripheral wall formed with an arcuate guide face 123 straddling the locking groove 124. The press button 12 has a second end formed with a receiving recess 121 to receive an elastic member 122 which is biased between the second end of the press button 12 and a wall of the receiving chamber 11 of the handle 10. The second end of the press button 12 has a top face formed with a recessed pressing portion 16.

The blade 20 has an end portion mounted in the mounting recess 13 of the handle 10. The end portion of the blade 20 has a first side formed with a first hook 22 detachably locked in the locking groove 124 of the press button 12 and detachably hooked on the locking pin 1242 and a second hook 21 detachably hooked on the positioning pin 15. The first hook 22 of the blade 20 has a peripheral wall formed with a ramp 221. The end portion of the blade 20 has an end face formed with an arc-shaped concave face 23 rested on the convex face 131 of the handle 10.

Figure 4:
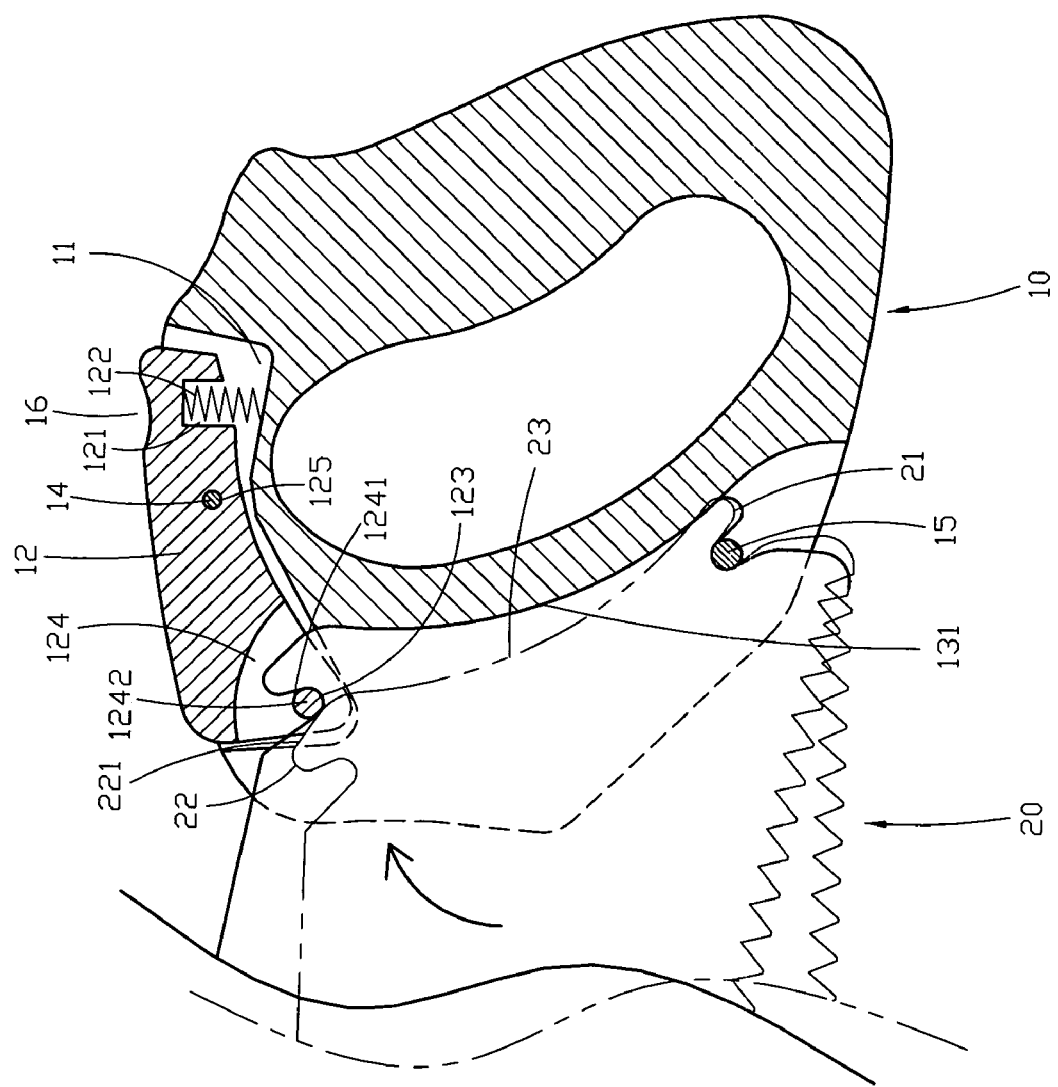
FIG. 4 is a schematic operational view of the handsaw as shown in FIG. 3.
Figure 5:
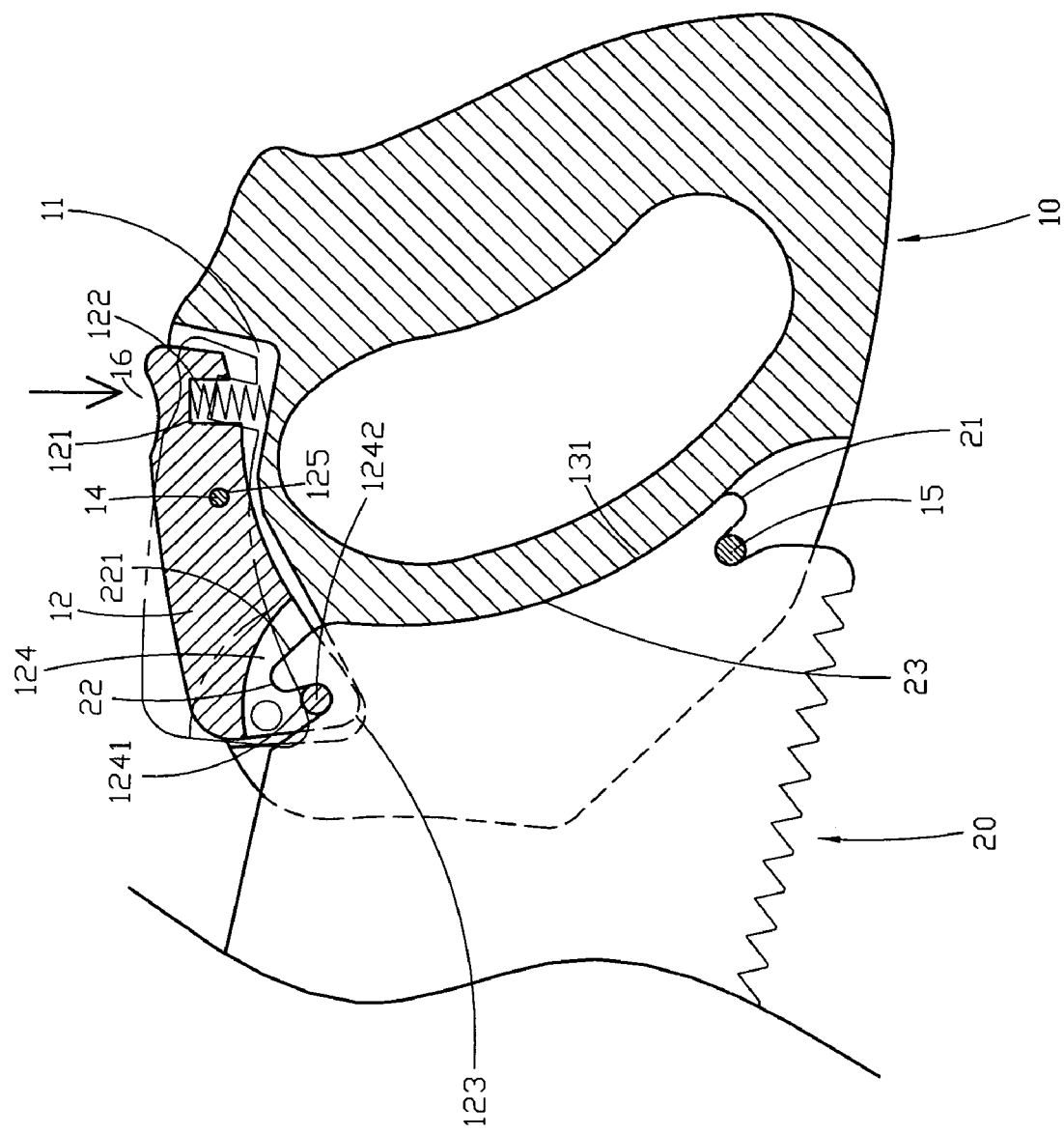
FIG. 5 is a schematic operational view of the handsaw as shown in FIG. 3.

In assembly, referring to FIGS. 3-5 with reference to FIGS. 1 and 2, the second hook 21 of the blade 20 is initially inserted into the mounting recess 13 of the handle 10 and hooked on the positioning pin 15. Then, the first hook 22 of the blade 20 is inserted into the mounting recess 13 of the handle 10. At this time, the ramp 221 of the first hook 22 of the blade 20 is pressed on the guide face 123 of the press button 12 as shown in FIG. 4 to push the first end of the press button 12 to move upward, so that the first hook 22 of the blade 20 is inserted into the locking groove 124 of the press button 12 and passed through the locking pin 1242. In addition, when the first end of the press button 12 is moved upward, the press button 12 is pivoted about the pivot pin 14, so that the second end of the press button 12 is moved downward to compress the elastic member 122. After the first hook 22 of the blade 20 is passed through the locking pin 1242, the first end of the press button 12 is moved downward by the restoring force of the elastic member 122, so that the first hook 22 of the blade 20 is locked in the locking groove 124 of the press button 12 and hooked on the locking pin 1242 as shown in FIG. 3. In such a manner, the second hook 21 of the blade 20 is hooked on the positioning pin 15, and the first hook 22 of the blade 20 is hooked on the locking pin 1242, so that the blade 20 is fixed on the handle 10. At this time, the concave face 23 of the blade 20 is rested on the convex face 131 of the handle 10 as shown in FIG. 3, so that the blade 20 is supported by the handle 10 rigidly and stably, thereby facilitating a user operating the handsaw.

As shown in FIG. 5, when the blade 20 needs to be replaced, the pressing portion 16 of the press button 12 is pressed downward to pivot the press button 12 to move the first end of the press button 12 upward so as to move the locking pin 1242 upward, thereby releasing the first hook 22 of the blade 20 from the locking pin 1242, so that the first hook 22 of the blade 20 can be detached from the locking groove 124 of the press button 12 and the mounting recess 13 of the handle 10 to detach the blade 20 from the handle 10, thereby facilitating the user replacing the blade 20.

Accordingly, the blade 20 can be detached from the handle 10 easily and rapidly by pressing the pressing portion 16 of the press button 12, thereby facilitating the user replacing the blade 20. In addition, the concave face 23 of the blade 20 is rested on the convex face 131 of the handle 10 as shown in FIG. 3, so that the blade 20 is supported by the handle 10 rigidly and stably, thereby facilitating a user operating the handsaw.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A handsaw, comprising:
   a handle;
   a blade removably mounted on the handle;
   a press button pivotally mounted on the handle and detachably engaged with the blade to lock the blade on the handle and unlock the blade from the handle;
   wherein the press button is pivotable relative to the blade between a first position where the blade is locked by the press button and is locked on the handle and a second position where the blade is unlocked from the press button and is removed from the handle;
   the handle has a top face formed with a longitudinal receiving chamber to receive the press button;
   the handle has a side face formed with a mounting recess having a first end communicated with the receiving chamber and a second end provided with a positioning pin, where the press button has a first end formed with a longitudinal locking groove communicated with the receiving chamber of the handle and a transverse positioning hole perpendicular to the locking groove, the handsaw further comprises a locking pin extended through the positioning hole of the press button to move with the press button, and the blade has an end portion having a first side formed with a first hook detachably hooked on the locking pin and a second hook detachably hooked on the positioning pin, where the press button is pivotable relative to the blade to lift the locking pin to detach the first hook of the blade from the locking pin to remove the blade from the handle and the press button.

2. The handsaw in accordance with claim 1, wherein the handle has a peripheral wall formed with a transverse fixing hole extended through and communicated with the receiving chamber, the press button has a mediate portion formed with a pivot hole aligning with the fixing hole of the handle, and the handsaw further comprises a pivot pin extended through the fixing hole of the handle and the pivot hole of the press button so that the press button is pivotally mounted on the handle.

3. The handsaw in accordance with claim 1, wherein the press button is pivotally mounted in the receiving chamber of the handle.

4. The handsaw in accordance with claim 1, wherein the first hook of the blade is detachably locked in the locking groove of the press button.

5. The handsaw in accordance with claim 1, wherein the locking pin straddles and is perpendicular to the locking groove of the press button.

6. The handsaw in accordance with claim 1, wherein the positioning hole of the press button is transversely extended through and communicated with the locking groove.

7. The handsaw in accordance with claim 1, wherein the mounting recess of the handle has a bottom wall formed with an arc-shaped convex face located between the receiving chamber and the positioning pin, and the end portion of the blade has an end face formed with an arc-shaped concave face located between the first hook and the second hook and rested on the convex face of the handle.

8. The handsaw in accordance with claim 1, wherein the first end of the press button has a peripheral wall formed with an arcuate guide face, and the first hook of the blade has a peripheral wall formed with a ramp that is movable to press the guide face of the press button to push the first end of the press button to move upward, so that the first hook of the blade is inserted into the locking groove of the press button and hooked on the locking pin.

9. The handsaw in accordance with claim 8, wherein the guide face of the press button straddles and is perpendicular to the locking groove.

10. The handsaw in accordance with claim 1, wherein the end portion of the blade is detachably mounted in the mounting recess of the handle.

11. The handsaw in accordance with claim 1, wherein the press button has a second end having a bottom face formed with a receiving recess to receive an elastic member which is biased between the second end of the press button and a wall of the receiving chamber of the handle.

12. The handsaw in accordance with claim 11, wherein after the first hook of the blade is hooked on the locking pin, the first end of the press button is moved downward by a restoring force of the elastic member to move the locking pin downward relative to the blade, so that the first hook of the blade is locked in the locking groove of the press button and hooked on the locking pin.

13. The handsaw in accordance with claim 11, wherein the second end of the press button has a top face formed with a recessed pressing portion.

14. The handsaw in accordance with claim 13, wherein the blade is detached from the handle by pressing the pressing portion of the press button to detach the first hook of the blade from the locking pin.

* * * * *